United States Patent [19]

Hotta

[11] Patent Number: 4,494,057
[45] Date of Patent: Jan. 15, 1985

[54] SPEED CONTROL SYSTEM FOR SMALL MEDICAL MOTORS

[75] Inventor: Toshihiro Hotta, Kyoto, Japan

[73] Assignee: Kabushiki Kaisha Morita Seisakusho, Kyoto, Japan

[21] Appl. No.: 446,318

[22] Filed: Dec. 2, 1982

[30] Foreign Application Priority Data

Dec. 5, 1981 [JP] Japan .......................... 56-181421[U]

[51] Int. Cl.³ ................................. G05B 5/00
[52] U.S. Cl. .................... 318/317; 318/308; 318/331; 318/334
[58] Field of Search ............... 318/308, 317, 332, 341, 318/331, 334, 471–473, 345 C, 345 CA, 345 AB, 345 B, 345 F, 345 G; 361/23, 24, 31, 30, 33, 79

[56] References Cited

U.S. PATENT DOCUMENTS

| | | | |
|---|---|---|---|
| 3,309,596 | 3/1967 | Limley | 318/331 |
| 3,396,323 | 8/1968 | Auld | 318/331 |
| 3,463,990 | 8/1969 | Ross | 318/345 C X |
| 3,475,672 | 10/1969 | Oltendorf | 318/308 |
| 3,527,991 | 9/1970 | Sackin | 318/473 X |
| 3,560,828 | 2/1971 | Kobayashi et al. | 318/345 F |
| 3,601,673 | 8/1971 | Mason | 318/308 |
| 3,624,474 | 11/1971 | Nolf | 318/331 |
| 3,781,620 | 12/1973 | Toth | 318/331 |
| 3,838,324 | 9/1974 | Watanabe | 318/331 |
| 3,955,170 | 5/1976 | Geishecker | 318/471 X |
| 4,048,549 | 9/1977 | Satoh | 318/345 F |
| 4,384,241 | 5/1983 | Stillhard | 318/317 |
| 4,408,244 | 10/1983 | Weible | 318/471 X |

Primary Examiner—Ulysses Weldon
Attorney, Agent, or Firm—Koda and Androlia

[57] ABSTRACT

A speed control system for small medical motors. The system comprises a drive voltage regulation circuit, a current detection circuit which generates a detection signal in accordance with motor current, a voltage detection circuit which generates a detection signal in accordance with motor voltage, and a speed control circuit which controls the drive voltage regulation circuit in accordance with the detection signals of both detection circuits. With this system, the detection signal of the current detection circuit is positive-fed back, and the detection signal of the voltage detection circuit is negative-fed back to the speed control circuit to keep motor speed constant by effectively coping with abrupt load fluctuation.

6 Claims, 4 Drawing Figures

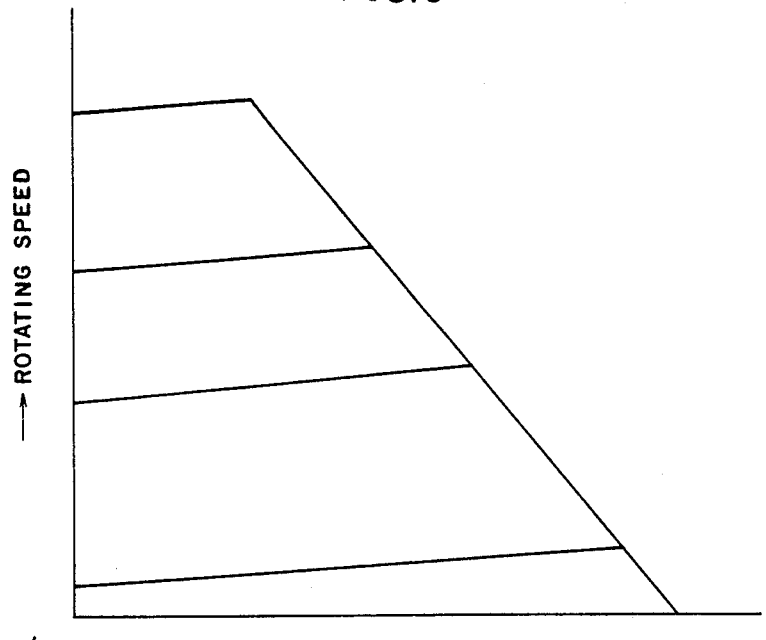
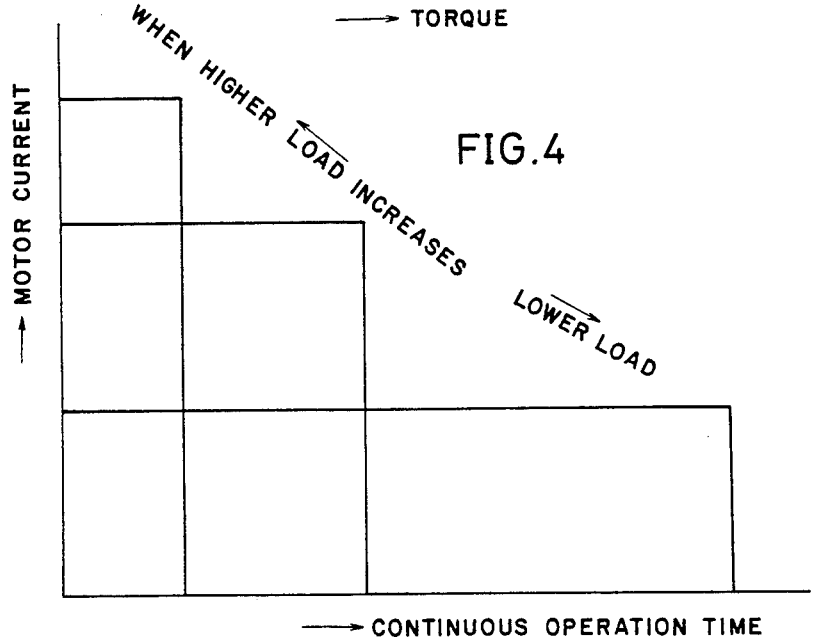

SPEED CONTROL SYSTEM FOR SMALL MEDICAL MOTORS

BACKGROUND OF THE INVENTION

1. Field of the Invention

This invention relates to a speed control system for small medical motors used for dental handpieces and other medical apparatuses.

2. Prior Art

In these days, medical apparatus driven by micromotors are being made smaller as the performance of micro-motors is being improved. Under this situation, dental handpieces driven by micro-motors instead of conventional electric engines or air turbines have been developed. To drive micro-motors, the dropper method by a power transistor has been frequently used. However, the micro-motors for conventional handpiece apparatuses have great speed fluctuation, and cannot deliver stable rotational speed. To solve this problem, current increase under load is detected, and positive-fed back to the control section, preventing speed reduction and keeping a constant speed. However, this attempt has not yet reached satisfactory results, i.e., motor speed decreases or increases excessively as load increases as shown in FIG. 2.

SUMMARY OF THE INVENTION

It is an object of the present invention to provide a speed control system for small medical motors, which is capable of keeping motor speed constant by positive feedback of motor load current to motor drive voltage and by negative feedback of drive voltage. This method can cope with abrupt load fluctuation more effectively than the oscillation prevention method which uses a capacitor in the convention positive feedback circuit.

BRIEF DESCRIPTION OF THE DRAWINGS

The above-described features and objects of the present invention will become more apparent with reference to the following description taken in conjunction with the accompanying drawings, wherein like reference numerals denote like elements, and in which:

FIGS. 2 and 3 show the torque-versus-speed characteristics of a prior art and the embodiment of this invention respectively; and FIG. 4 is a characteristic diagram showing the relationship between continuous operation time and motor current of the embodiment of this invention.

DETAILED DESCRIPTION OF THE INVENTION

Figure 1:
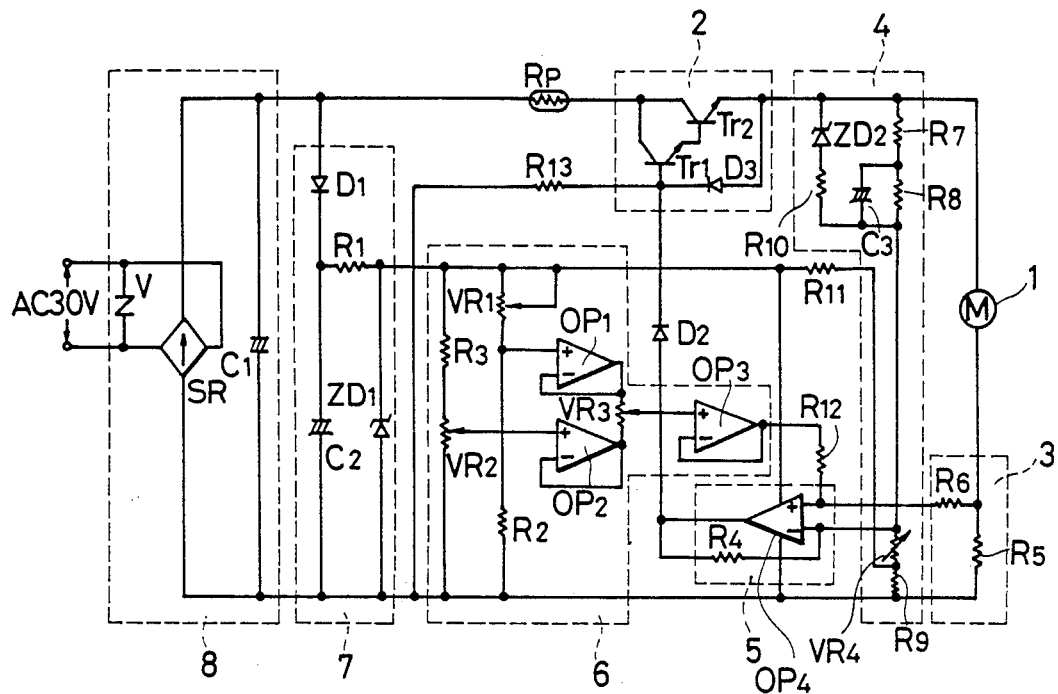
FIG. 1 is a current diagram of the embodiment of the invention.
Figure 2:
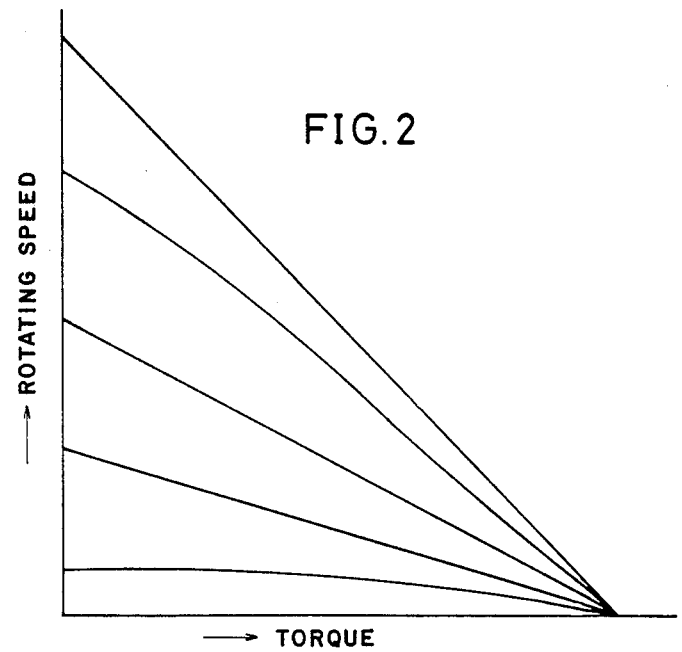

Referring to FIG. 1, 1 is a DC micro-motor, a small motor used as a cutting drive source, for example, 2 is a drive voltage regulation circuit which regulates motor voltage, 3 is a motor current detection circuit, 4 is a motor voltage detection circuit, 5 is a speed control circuit which controls drive voltage regulation circuit 2, 6 is a speed setting circuit which generates a reference voltage, 7 is a constant voltage circuit which generates a stable control voltage, and 8 is a DC power supply circuit which delivers DC power to said circuits. OP1 to OP4 are operational amplifiers, R1 to R13 are resistors, VR1 to VR4 are variable resistors, D1 to D3 are diodes, ZD1 and ZD2 are zener diodes, C1 to C3 are capacitors, Tr1 and Tr2 are transistors, SR is a full-wave rectifier, V is varistor, and Rp is a posistor. DC micro-motor 1 is connected to DC power supply circuit 8 in series with drive voltage regulation circuit 2. Darlington-connected transistors Tr1 and Tr2 in drive voltage regulation circuit 2 regulate the drive voltage using the dropper method to control motor speed. DC motor 1 is further connected in series with current detection circuit 3. To this series circuit, voltage detection circuit 4 is connected in parallel. The detection signal detected by resistor R5 in current detection circuit 3 is fed to the noninverting terminal of operational amplifier OP4 through resistor R6. The detection signal, which is obtained through division by the series circuit composed of R7, R8, variable resistor VR4 and resistor R9, is adjusted by variable resistor VR4 to provide a proper torque level, and fed to the inverting terminal of operational amplifier OP4. In addition, the output from speed setting circuit 6 is fed to noninverting terminal of operational amplifier OP4 through resistor R 12. Consequently, speed control circuit 5 outputs a control signal so that DC micro-motor 1 rotates as the speed set by speed setting circuit 6, and thus controls drive voltage regulation circuit 2 through protection diode D2. Drive voltage regulation circuit 2 is also controlled by the cooperative action of the detection signal positive-fed back from current detection circuit 3 and the detection signal negative-fed back from voltage detection circuit 4. Accordingly, when a load is applied to DC micro-motor 1 and motor current increases this increase is positive-fed back, and current through drive voltage regulation circuit 2 increases. Thus, voltage drop due to resistance of motor windings is compensated for, and speed reduction is prevented. When drive voltage changes due to fluctuation of motor load, the change amount is negative-fed back to prevent drive voltage from changing.

Generally speaking, when positive feedback is excessive, motor speed is apt to increase as load becomes greater, and thus speed control cannot be performed properly sometimes. In this embodiment, a speed increase limiting circuit is included to activate negative feedback and to prevent excessive speed increase. The limiting circuit is composed of zener diode ZD2 and resistor R10 in voltage detection circuit 4. Zener diode ZD2 and resistor R10 connected in series are further connected in parallel with a series circuit of resistors R7 and R8. When the drive voltage exceeds the voltage level of the zener diode, the voltage generated at ZD2 and R10 is added to the voltage generated at resistors R7 and R8 to increase the level of the detection signal fed to the inverting terminal of operational amplifier OP4. As a result, negative feedback amount is increased. In this way, the circuit functions so that increase of drive voltage due to increase of load current does not excessively compensate for voltage drop due to resistance of motor windings.

FIG. 3 is a general characteristic diagram showing the relationship between torque and speed. This figure shows that a proper speed control is performed since an almost constant speed is obtained at each speed setting level, and voltage drop due to resistance of motor windings is compensated for according to increase of load torque.

Resistor R11 comprises a negative feedback circuit for low speed operation, and is inserted between the output of constant voltage circuit 7 and the connection point of variable resistor VR4 and resistor R9 in voltage detection circuit 4.

By resistor R11, a constant voltage is superimposed on the detection signal of voltage detection circuit 4, and thus negative feedback is applied. Consequently, the minimum drive voltage can be reduced from 2V to 1V for example, and the lower limit of motor speed can be reduced further.

This embodiment of series dropper type speed control system may be damaged due to heat generated by power loss at drive voltage regulation circuit 2 when the system is overloaded. Furthermore, small drive motors used for dental handpieces cannot endure continuous operation under overload.

To prevent overheat and damage of drive voltage regulation circuit 2 and DC micro-motor 1 during continuous operation, posistor Rp is connected in series with the main circuit.

It has a high positive temperature coefficient, and functions to restrict current flow in the main circuit under overload. As current increases, this function is more significant, and continuous operation time is made shorter. FIG. 4 shows the relationship between the continuous operation time and motor current. Speed setting circuit 6 includes a combination of operational amplifiers OP1, OP2 and OP3. The output of constant voltage circuit 7 is divided by variable resistor VR1 and resistor R2, and fed to noninverting terminal of operational amplifier OP1. The output of operational amplifiers OP1 and OP2 are connected to each other via variable resistor VR3, and fed to the noninverting terminal of operational amplifier OP3. With this configuration, the set value can be adjusted independently by the combination of variable resistor VR1 and operational amplifier OP1 and the combination of variable resistor VR2 and operational amplifier OP2. The result of the adjustment is amplified by operation amplifier OP3, and fed to the noninverting terminal of operational amplifier OP4 in speed control circuit 5 through resistor R12 as described above. Speed setting circuit 6 and speed control circuit 5 are powered by constant voltage circuit 7 instead of DC power supply circuit 8. Therefore, even when voltage drop occurs in DC power supply circuit 7, stable control can be performed. Thus, comparative smoothing capacitor C1 can be selected according to load, or can be eliminated. Varistor V in DC power supply circuit 8 is used to absorb surge voltage from the power source. Although the above embodiment is a series dropper type using a smoothened DC power supply, this invention can be applicable to a switching control type using a full-wave rectified pulsating current power supply. In this case, however, voltage and current detection signals have pulsating waveforms, and counter measures must be taken according to the waveforms by connecting a capacitor to resistor R4 in parallel to form an integration circuit for detection signals or by taking other means. However, the integration circuit is not required for the system of the embodiment. Accordingly, the load response of the system can be made higher. R13 and D3 in the diagram are respectively a resistor and a diode for circuit protection.

As clearly understood by the above explanation, the system of this invention controls motor speed by the cooperative action of positive feedback of motor load current to motor drive voltage and negative feedback of drive voltage. As a result, the system can keep motor speed constant by effectively responding to abrupt load fluctuation, and is significantly effective when applied for medical equipment particularly such as dental handpiece which are subject to abrupt load fluctuation.

It should be apparent to those skilled in the art that the above-described embodiment is merely illustrative of but one of the many specific embodiments which represent the application of the principles of the present invention. Numerous and varied other arrangements can be readily devised by those skilled in the art without departing from the spirit and scope of the invention.

I claim:

1. A speed control system for a small medical motor used for dental handpieces and medical apparatuses which is responsive to an applied motor drive voltage and current from a direct current power supply, comprising:
    a drive voltage regulator circuit connected in series with said motor;
    a current detection circuit for generating a current detection signal in accordance with motor current;
    a voltage detection circuit for generating a voltage detection signal in accordance with the motor voltage coupled in parallel to said motor and which comprises:
        a dividing means for dividing a portion of the drive voltage;
        a speed-up limiting circuit having a gradually increasing speed-load characteristic connected in series with said dividing means and comprising:
        a zener diode;
        at least two division resistors connected in parallel to said zenor diode; and
        a capacitor connected in parallel to one of said division resistors; and
    a speed control circuit which controls the drive voltage regulation circuit in accordance with the voltage and current detection signals of both detection circuits, said speed control circuit having positive and negative feedback inputs with said voltage detection signal coupled to said negative feedback input and said current detection signal coupled to said positive feedback input;
    whereby the current detection signal of said current detection circuit is positive-fedback and the voltage detection signal of said voltage detection circuit is negative-fedback to said speed control circuit to keep motor speed at a gradually increasing speed-load characteristic set by said speed-up limiting circuit.

2. A speed control system according to claim 1, wherein said speed up limiting circuit increases the negative-feed back when the speed of the motor exceeds a predetermined amount.

3. A speed control system according to claim 1, wherein said current detection circuit comprises a resistor in series with said small motor.

4. A speed control system for small medical motors according to claim 1, wherein said drive voltage regulation circuit comprises at least two Darligton-connected transistors.

5. A speed control system according to claim 1, further comprising an overload protection circuit provided in series with said drive voltage regulation circuit for restricting current supplied to said small motor during overload.

6. A speed control system according to claim 5, wherein said overload protection circuit comprises a positive temperature coefficient resistor in series with said motor.

* * * * *